United States Patent
Hu et al.

(10) Patent No.: US 11,949,535 B2
(45) Date of Patent: Apr. 2, 2024

(54) ITEM MANAGEMENT SYSTEM FOR CONNECTED APPLIANCES

(71) Applicant: Haier US Appliance Solutions, Inc., Wilmington, DE (US)

(72) Inventors: Haitian Hu, Louisville, KY (US); Hairong Li, Louisville, KY (US); Steven Keith Root, Buckner, KY (US); James Quentin Pollett, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 118 days.

(21) Appl. No.: 17/703,132

(22) Filed: Mar. 24, 2022

(65) Prior Publication Data
US 2023/0308307 A1    Sep. 28, 2023

(51) Int. Cl.
*H04L 12/28*    (2006.01)
*G06V 10/94*    (2022.01)

(52) U.S. Cl.
CPC .......... *H04L 12/2827* (2013.01); *G06V 10/95* (2022.01); *H04L 12/2821* (2013.01)

(58) Field of Classification Search
CPC ................................................ H04L 12/2827
See application file for complete search history.

(56) References Cited

U.S. PATENT DOCUMENTS

| | | | |
|---|---|---|---|
| 7,525,074 B2 | 4/2009 | Bostick et al. | |
| 2014/0014647 A1 | 1/2014 | Brosnan et al. | |
| 2020/0069111 A1 | 3/2020 | Eiter et al. | |
| 2020/0363778 A1* | 11/2020 | Mahapatra | G05B 15/02 |
| 2022/0273139 A1* | 9/2022 | Mahapatra | G05B 13/0265 |

FOREIGN PATENT DOCUMENTS

| | | |
|---|---|---|
| CN | 106854807 A | 6/2017 |
| CN | 110702559 A | 1/2020 |
| KR | 101645102 B1 | 8/2016 |
| WO | WO2018188913 A1 | 10/2018 |
| WO | WO2020054609 A1 | 3/2020 |

* cited by examiner

*Primary Examiner* — Travis R Hunnings
(74) *Attorney, Agent, or Firm* — Dority & Manning, P.A.

(57) ABSTRACT

An item-management system is provided having a household appliance, a camera assembly, and a controller. The household appliance may include a cabinet. The camera assembly may be directed at the cabinet to capture an image of the cabinet. The controller may be in operative communication with the camera assembly. The controller may have access to an item list of one or more stored items. The controller may be configured to direct an item-management operation. The item-management operation may include receiving the image from the camera assembly, identifying, automatically, based on the received image, a stored item from the item list, determining, based on identifying the stored item, an unsuitable status of the identified stored item to indicate the identified stored item is inappropriate for the household appliance, and directing, based on determining the unsuitable status, a responsive action at the household appliance.

18 Claims, 5 Drawing Sheets

ITEM MANAGEMENT SYSTEM FOR CONNECTED APPLIANCES

FIELD OF THE INVENTION

The present subject matter relates generally to appliances, and more particularly to appliance improvement methods and systems.

BACKGROUND OF THE INVENTION

Household appliances serve many functions in a household, including washing items, drying items, keeping items cold or frozen, cooking or baking items, and so forth. These appliances are used with a multitude of items, with some items being cross functional, or able to be used in or on multiple household appliances. For example, an item may be appropriate for use with a cooktop, an oven, a microwave, and a dishwasher. In some cases, items may be unsuitable for some appliances, such as items not suitable for microwave appliances (i.e., not "microwave safe"). Some items are not suitable for a dryer appliance. Further, some items do not belong on or in a range appliance. Households generally have many items, which each are or appropriate for different appliances within a household. As such, remembering which items are appropriate for which appliances can be challenging. Although some items include markings to indicate that a given item is or is not suitable for certain appliances, these markings can be difficult to read or may fade over time.

Challenges may likewise exist when several people share a household, or when the household invites users outside the household come into the household and use various household appliances therein. Additionally, all members of a household may not have the same knowledge about all the items in a household, which may result in items being in or on an appliance they are ill suited for.

Accordingly, a method that decreases instances of items being improperly used or treated would be beneficial. Additionally or alternatively, a system that coordinates item management within a household would also be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an item-management system is provided. The item-management system may include a household appliance, a camera assembly, and a controller. The household appliance may include a cabinet. The camera assembly may be directed at the cabinet to capture an image of the cabinet. The controller may be in operative communication with the camera assembly. The controller may have access to an item list of one or more stored items. The controller may be configured to direct an item-management operation. The item-management operation may include receiving the image from the camera assembly, and identifying, automatically based on the received image, a stored item from the item list. The item-management operation may further include determining, based on identifying the stored item, an unsuitable status of the identified stored item to indicate the identified stored item is inappropriate for the household appliance and directing, based on determining the unsuitable status, a responsive action at the household appliance.

In another exemplary aspect of the present disclosure, a method of directing an item-management operation is provided. The method may include the steps of receiving an image from a camera assembly directed at a cabinet of a household appliance, and identifying, automatically based on the received image, a stored item from an item list of one or more stored items. The method may further include determining, based on identifying the stored item, an unsuitable status of the identified stored item to indicate the identified stored item is inappropriate for the household appliance, and directing, based on determining the unsuitable status, a responsive action for the household appliance. The camera assembly may be directed at the cabinet to capture the image of the cabinet. A controller in operative communication with the camera assembly may have access to the item list and may be configured to direct the item-management operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Use of the same of similar reference numerals in the figures denotes the same or similar features unless the context indicates otherwise.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Terms such as "inner" and "outer" refer to relative directions with respect to the interior and exterior of the household appliance, and in particular the chamber(s) defined therein. For example, "inner" or "inward" refers to the direction towards the interior of the household appliance. Terms such as "left," "right," "front," "back," "top," or "bottom" are used with reference to the perspective of a user accessing the appliance (e.g., when the door is in the closed position). For example, a user stands in front of the appliance to open a door and reaches into the internal chamber(s) to access items therein.

The embodiments described herein advantageously provides an item-management system that may provide a system to minimize articles being placed or used in household appliances the articles are ill suited for. Advantageously, the system provides a way to address or alert a user to a condition wherein an article being placed on or in a household appliance and the article is improper for use with that household appliance. Thus, instead of all users having to know which articles are appropriate for which household appliances within a household, the system may alert the user or prevent the household appliance from being used with articles identified as improper for each household appliance.

Figure 1:
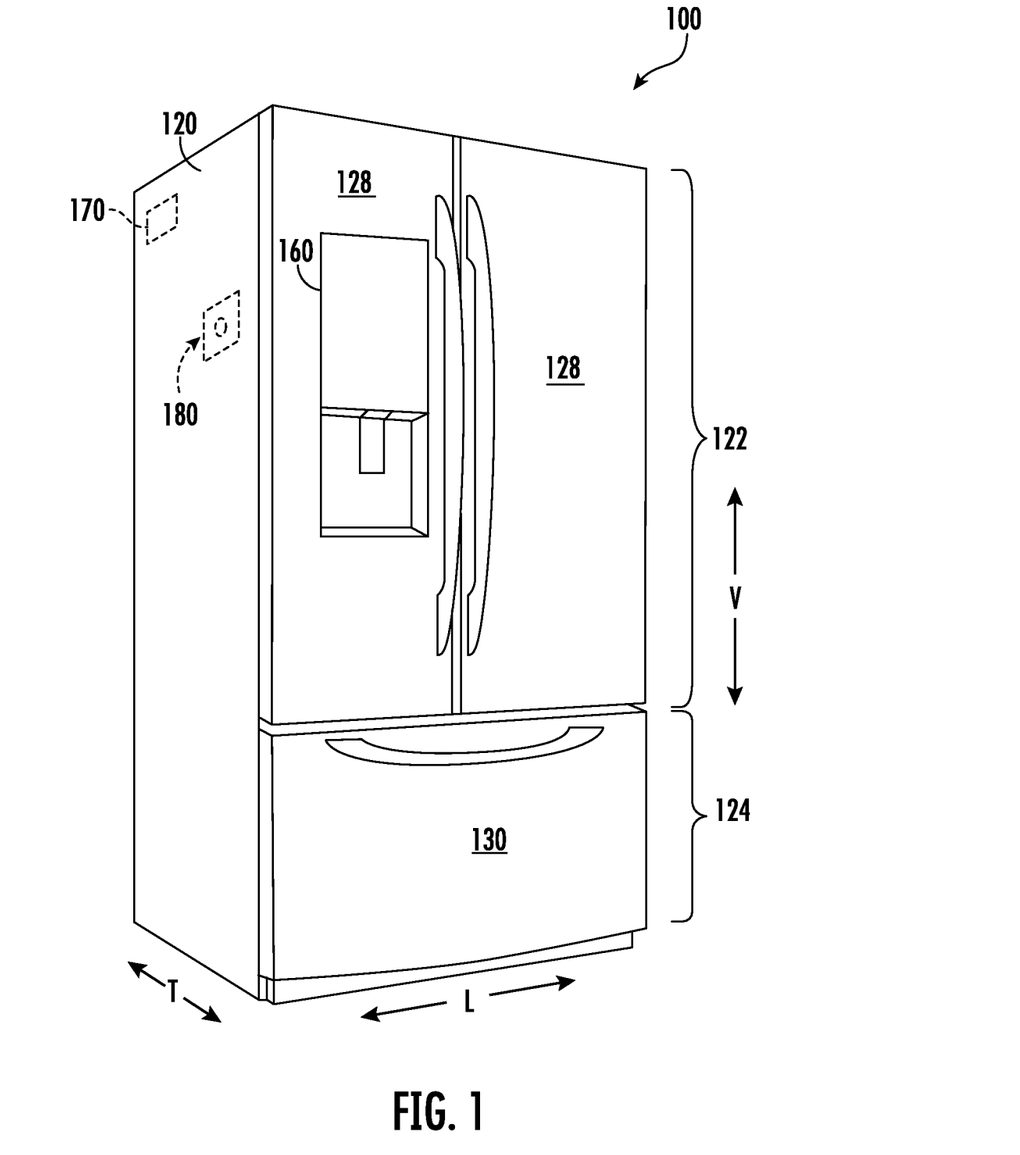
FIG. 1 provides a perspective view of an exemplary household appliance according to exemplary embodiments of the present disclosure.
Figure 2:
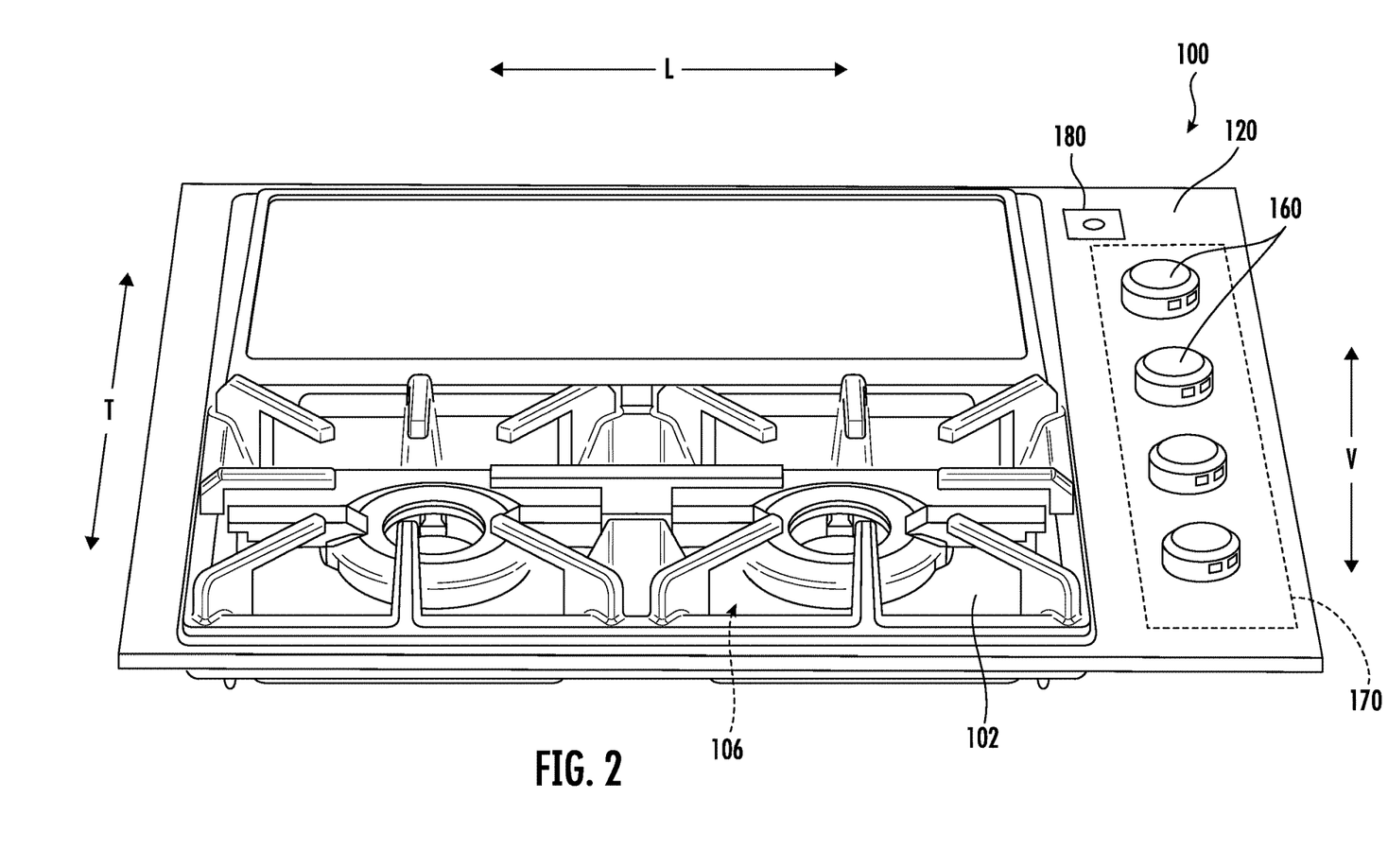
FIG. 2 provides a perspective view of a second exemplary household appliance according to exemplary embodiments of the present disclosure.
Figure 3:
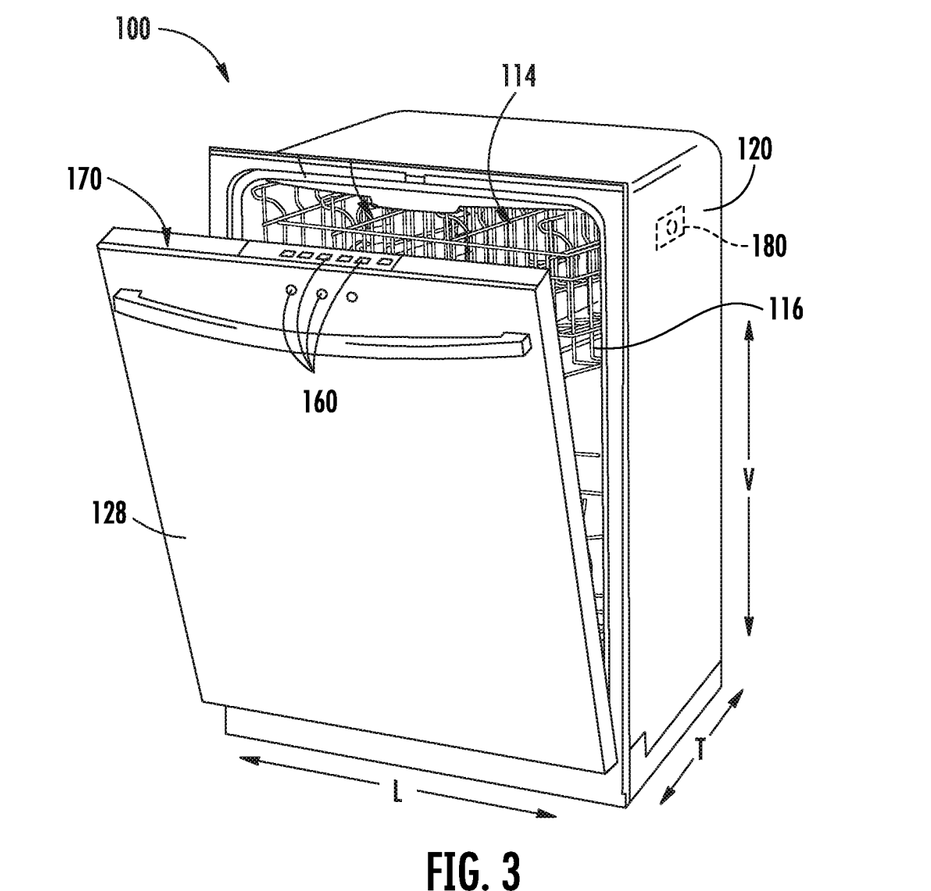
FIG. 3 provides a perspective view of a third exemplary household appliance according to exemplary embodiments of the present disclosure.

Turning now to the figures, FIGS. 1 through 3 illustrate embodiments of a household appliance 100 according to exemplary embodiments of the present disclosure. As generally shown throughout FIGS. 1 through 3, each appliance 100 includes a cabinet 120 that defines a vertical direction V, a lateral direction L and a transverse direction T that are mutually perpendicular. In some embodiments, one or more communications features (e.g., controls 160 or a camera assembly 180) are mounted on cabinet 120. Cabinet 120 may have sides, a front and a back, shown in FIGS. 1 and 3, or may be a frame or support structure, as shown in FIG. 2.

It is noted that, although FIGS. 1, 2, and 3 illustrate household appliance 100 as a refrigerator appliance, cooktop appliance, and dishwasher appliance, respectively; these are provided by way of example only. Moreover, the present subject matter may be used in any suitable household appliance. For instance, the present subject matter may include or be applicable to one or more microwave ovens, washing machine appliances, dryer appliances, cooktop appliances, range appliances, oven appliances, dishwashing appliances, refrigerator appliances, etc. Exemplary embodiments of appliance 100 will be described below, with the understanding that other embodiments may include or be provided as another suitable household appliance (e.g., having a cabinet 120).

In some embodiments, household appliance 100 includes camera assembly 180. Camera assembly 180 is generally directed toward cabinet 120. Camera assembly 180 may be configured to capture images of a portion of household appliance 100, as will be described in more detail below. For example, camera assembly 180 may be directed at cabinet 120 to capture an image of cabinet 120. As shown, camera assembly 180 may be a part of household appliance 100. In some embodiments, camera assembly may be separate from household appliance 100, and directed at cabinet 120 of appliance 100. For example, camera assembly 180 may be mounted above a cooktop 100 in vertical direction V and directed toward cabinet 120. In additional or alternative examples, camera assembly 180 may be located within a cabinet 120, such as in a freezer of a refrigerator appliance (as in FIG. 1), located within a microwave, directed toward a wash chamber of a washing machine, or directed toward an inner chamber of a dishwasher appliance (as in FIG. 3). Camera assembly 180 may be configured to communicate with a controller 170 of appliance 100 or may be configured to communicate with a remote user device 210 (e.g., by a controller 270) or with a wide area network 250 (also herein called a remote network). Camera assembly 180 may include or be in communication with a memory to store images captured by camera assembly 180. Camera assembly 180 may additionally or alternatively be configured to transmit, either directly or indirectly (such as through controller 170) image files to memory storage, such as a memory 234 of controller 170 or controller 270.

Generally, camera assembly 180 may be any type of device suitable for capturing at least one image or video. As an example, camera assembly 180 may be a video camera or a digital camera with an electronic image sensor [e.g., a charge coupled device (CCD) or a CMOS sensor]. Although the term "image" is used herein, it should be appreciated that according to exemplary embodiments, camera assembly 180 may take any suitable number or sequence of two-dimensional images, videos, or other visual representations of cabinet 120 or items (e.g., articles) positioned therein. For example, the one or more images may include a video feed, or a series of sequential static images obtained by camera assembly 180 that may be transmitted to controller 170 (e.g., as a data signal) for analysis or other manipulation. In some embodiments, camera assembly 180 transmits images or video feed directly to remote user device 210 (e.g., through wireless signal). Optionally, one or more light sources (not shown) may be provided with or adjacent to the camera assembly 180. During use, camera assembly 180 may take images or video feed in coordination with the light sources such as to obtain higher quality or truer-to-color images of cabinet 120 or items therein or thereon.

Household appliance 100 may further include a controller 170 and controls 160 (e.g., a user interface panel). Controls 160 may, for example, provide selections for user manipulation of the operation of an appliance. In various embodiments, the user interface panel, or controls 160 may represent a general purpose I/O ("GPIO") device or functional block. In some embodiments, the controls 160 may include or be in provided as a user input device e.g., controls 160 in FIGS. 1 through 4), such as one or more of a variety of digital, analog, electrical, mechanical, or electro-mechanical input devices including rotary dials, control knobs, push buttons, and touch pads. The user interface panel 160 may include a display component e.g., controls 160 in FIG. 1), such as a digital or analog display device designed to provide operational feedback to a user. The display component may also be a touchscreen capable of receiving a user input, such that the display component may also be a user input device in addition to or instead of the user input device 160.

Figure 4:
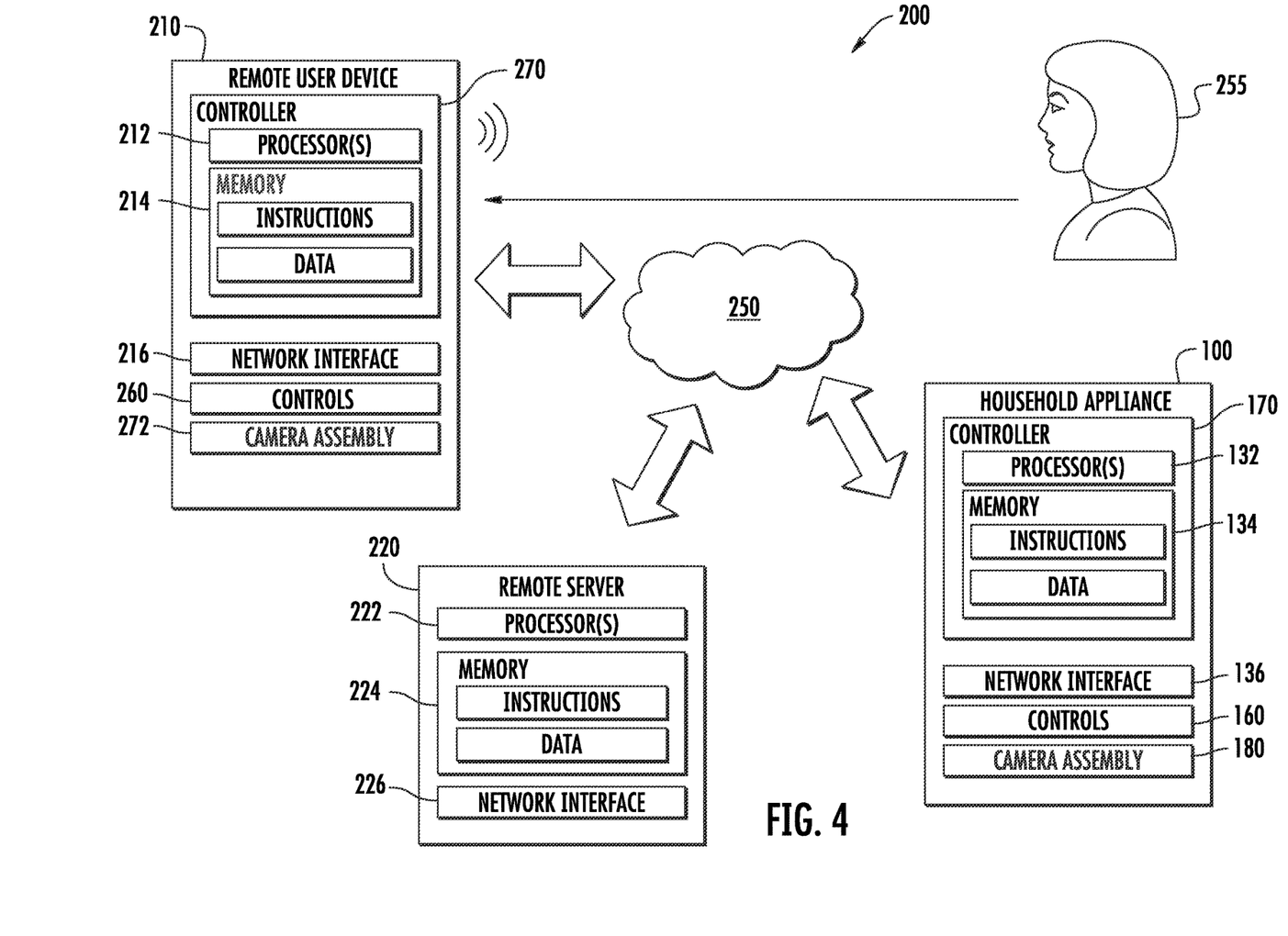
FIG. 4 provides a schematic view of an exemplary system according to exemplary embodiments of the present disclosure.

Generally, controller 170 may be in operative communication with controls 160. The controls 160 may be in communication with the controller 170 via, for example, one or more signal lines or shared communication busses. Input/output ("I/O") signals may be routed between controller 170 and various operational components of the appliances 100. Operation of the appliances 100 may each be regulated by the respective controller 170 that is operatively coupled to the corresponding controls 160. For instance, in response to user manipulation of controls 160, controller 170 may operate various components of the appliance 100. Each controller 170 may include a memory (e.g., a memory 134 in FIG. 4) and one or more microprocessors, CPUs, or the like, such as general or special purpose microprocessors operable to execute programming instructions or microcontrol code associated with operation of appliance 100 (e.g., in FIG. 4, shown as "instructions" and "data" with memory 134, and a processor 132 in controller 170). The memory may represent random access memory such as DRAM or read only memory such as ROM or FLASH. In one embodiment, the processor executes programming instructions stored in memory. The memory may be a separate component from the processor or may be included onboard within the processor. Alternatively, a controller 170 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

The controller 170 may be programmed to operate the respective appliance 100 by executing instructions stored in memory. For example, the instructions may be software or any set of instructions that when executed by the processing device, cause the processing device to perform operations. Controller 170 can include one or more processor(s) and associated memory device(s) configured to perform a variety of computer-implemented functions or instructions (e.g. performing the methods, steps, calculations and the like and storing relevant data as disclosed herein). It should be noted that controllers 170 as disclosed herein are capable of and may be operable to perform any methods and associated method steps (e.g., as, or as part of, a commissioning operation) as disclosed herein.

In some embodiments, appliance 100 (e.g., by use of controller 170) may further be configured to communicate with one or more separate, external devices, such as a remote user device, a remote server, or another household appliance. Such communication may be performed either directly or via one or more intermediate networks (e.g., a wide area network 250, such as the internet), as will be discussed in more detail below.

In the exemplary embodiments of FIG. 1, household appliance 100 may be provided as a refrigerator appliance 100. In the exemplary embodiments of FIG. 2, household appliance is provided as a cooktop appliance 100. In the exemplary embodiments of FIG. 3, household appliance is provided as a dishwasher appliance 100.

Turning especially to FIG. 1, household appliance 100 may be provided as a refrigerator appliance. As shown, refrigerator appliance 100 includes a housing or cabinet 120 that defines one or more chilled chambers for receipt of food items for storage. In particular, cabinet 120 defines a fresh food chamber 122 positioned at or adjacent the top of cabinet 120 and a freezer chamber 124 arranged at or adjacent the bottom of cabinet 120. As shown, refrigerator doors 128 and freezer door 130 may allow selective access to fresh food chamber 122 or freezer chamber 124, respectively. As such, refrigerator appliance 100 is generally referred to as a bottom mount refrigerator. A controller 170 and controls 172 may direct refrigerator activities, as generally understood. It is recognized, however, any other suitable appliance or refrigerator style, such as, for example, a top mount refrigerator appliance, a side-by-side style refrigerator appliance, etc. may be provided.

Turning especially to FIG. 2, household appliance 100 may be provided as a cooktop. Cooktop 100 generally includes cabinet 120, provided here as a frame or support structure 120 on which one or more communication features (e.g., controls 160 or a camera assembly 180) are mounted, and in which one or more features are housed (e.g., a burner assembly 102, controls 172). As shown, cooktop 100 includes at least one burner assembly 102, which is housed in a burner cavity 106. Burner assembly 102 may generally heat articles placed thereon, such as a pot or pan, as generally understood. A controller 170 and controls 172 may direct burner activities, as generally understood. A camera assembly 180 may further be provided to frame 120 and may be directed generally toward burner assembly 102 or burner cavity 106.

Turning especially to FIG. 3, household appliance 100 may be provided as a dishwasher appliance. Dishwasher 100 generally includes cabinet 120, housing an internal chamber 114, with a door 128 allowing selective access into internal chamber 114 of cabinet 120. Controls 160 and controller 170 may generally direct washing operations of dishwasher 100. Camera assembly 180 may be housed within cabinet 120, directed towards internal chamber 114. In some embodiments, cabinet 120 may further house at least one rack assembly 116, rack assembly 116 configured to house articles therein for washing. Dishwasher 100 may generally be configured to wash articles placed therein, and as would generally be understood.

Turning generally to FIG. 4, an item-management system 200 is depicted including a household appliance 100, a camera assembly (e.g., camera assembly 180 of appliance 100) and a controller in operative communication with the camera assembly (e.g., controller 170 of appliance 100). In some embodiments, the system further includes a remote user device 210, and a wide area network 250. In some embodiments, system 200 further includes a remote server 220.

In some embodiments, controller 170 includes a network interface 136 such that appliance 100 can connect to and communicate over one or more networks (e.g., network 250) with one or more network nodes. Network interface 136 can be an onboard component of controller 170 or it can be a separate, off board component. Controller 170 can also include one or more transmitting, receiving, or transceiving components for transmitting/receiving communications with other devices communicatively coupled across network 250. Additionally or alternatively, one or more transmitting, receiving, or transceiving components can be located off board controller 170.

Referring still to FIG. 4, a schematic diagram of an item-management system 200 will be described according to an exemplary embodiment of the present subject matter. In general, item-management system 200 may be configured for interaction, data transfer, and other communications between appliance 100 and one or more external devices. For example, this communication may be used to provide and receive an image of cabinet 120 of appliance 100 or to direct a responsive action at household appliance 100, as described in more detail below. In addition, it should be appreciated that item-management system 200 may be used to transfer data or other information to one or more external devices or appliances.

For example, item-management system 200 permits controller 170 of appliance 100 to communicate with a separate device external to appliance 100, such as remote user device 210, remote server 220, or another household appliance (such as another appliance within a household where appliance 100 resides). As described in more detail below, these communications may be facilitated using a wired or wireless connection, such as via a network 250. In general, remote user device 210 may be any suitable device separate from appliance 100 that is configured to provide or receive communications, information, data, or commands from a user. In this regard, remote user device 210 may be, for example, a personal phone, a smartphone, a tablet, a laptop or personal computer, a wearable device, a smart home system, or another mobile or remote device.

In some embodiments, item-management system 200 may include a plurality of appliances. For example, item-management system 200 may include a refrigerator appliance and a dishwasher appliance, or any other suitable combination of appliances, each appliance capable of communicating with at least one other device in the item-management system 200.

In addition, a remote server 220 may be in communication with appliance 100 or remote user device 210 through network 250. In this regard, for example, remote server 220 may be a cloud-based server 220, and is thus located at a distant location, such as in a separate state, country, etc. According to an exemplary embodiment, remote user device 210 may communicate with a remote server 220 over network 250, such as the Internet, to transmit/receive data or information, provide user inputs, receive user notifications or instructions, interact with or control appliance 100, etc. In addition, remote user device 210 and remote server 220 may communicate with appliance 100 to communicate similar information.

In some embodiments, remote user device 210 may include a controller 270 and a network interface 216. Controller 270 may include one or more processors 212 and one or more memory devices 214 (i.e., memory). The one or more processors 212 can be any suitable processing device (e.g., a processor core, a microprocessor, an ASIC, a FPGA, a microcontroller, etc.) and can be one processor or a plurality of processors that are operatively connected. The memory device 214 can include one or more non-transitory computer-readable storage mediums, such as RAM, ROM, EEPROM, EPROM, flash memory devices, magnetic disks, etc., and combinations thereof. The memory devices 214 can store data and instructions that are executed by the processor 212 to cause the remote user device 210 to perform operations. For example, instructions could be instructions for receiving images from camera assembly 180, directing a response action at household appliance 100, displaying an alert on a display of remote user device 210, downloading software applications, implementing software applications, etc. The memory devices 214 may also include data, such as identification data corresponding to the individual remote user device 210, stored blockchain files, stored software files, etc., that can be retrieved, manipulated, created, or stored by processor 212.

Remote user device 210 includes a network interface 216 such that remote user device 210 can connect to and communicate over one or more networks (e.g., network 250) with one or more network nodes. Network interface 216 can be an onboard component of controller 270 or it can be a separate, off board component. Controller 270 can also include one or more transmitting, receiving, or transceiving components for transmitting/receiving communications with other devices communicatively coupled across network 250. Additionally or alternatively, one or more transmitting, receiving, or transceiving components can be located off board controller 270.

In some embodiments, remote user device 210 includes a second camera assembly 272 or controls 260. Second camera assembly 272 may have similar features to camera assembly 180, but may be directed at a variety of angles, including at items for an item list, as described in more detail herein. Second camera assembly 272 may otherwise be as described for camera assembly 180. Similarly, controls 260 may function as user inputs similar to controls 160. Further, controls 260 may allow for user inputs, as will be described herein. Second camera assembly 272 or controls 260 may have various arrangements, as otherwise understood. In some embodiments controls 260 may include a remote user display, the remote user display being manipulatable by the user to send inputs to the system, as would be understood.

In general, communication between appliance 100, remote user device 210, remote server 220, or other user devices or appliances may be carried using any type of wired or wireless connection and using a suitable type of communication network, non-limiting examples of which are provided below. For example, remote user device 210 may be in direct or indirect communication with appliance 100 through any suitable wired or wireless communication connections or interfaces, such as network 250. For example, network 250 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 220, such as a web server, is in operative communication with remote user device 210. The remote server 220 can be used to host an information database (e.g., software applications, blockchain files, payment data files, item list tables, etc.). The server can be implemented using any suitable computing device(s). The remote server 220 may include one or more processors 222 and one or more memory devices 224 (i.e., memory). The one or more processors 222 can be any suitable processing device (e.g., a processor core, a microprocessor, an ASIC, a FPGA, a microcontroller, etc.) and can be one processor or a plurality of processors that are operatively connected. The memory device 224 can include one or more non-transitory computer-readable storage mediums, such as RAM, ROM, EEPROM, EPROM, flash memory devices, magnetic disks, etc., and combinations thereof. The memory devices 224 can store data and instructions which are executed by the processor 222 to cause remote server 220 to perform operations. For example, instructions could be instructions could be instructions for receiving, interpreting, or sending an image file, downloading software applications, implementing software applications, etc. The data can be stored in one or more databases. The one or more databases can be connected to remote server 220 by a high bandwidth LAN or WAN or can also be connected to remote server 220 through network 250. The one or more databases can be split up so that they are located in multiple locales.

Remote server 220 includes a network interface 226 such that remote server 220 can connect to and communicate over one or more networks (e.g., network 250) with one or more network nodes. Network interface 226 can be an onboard component or it can be a separate, off board component. In turn, remote server 220 can exchange data with one or more nodes over the network 250. In particular, remote server 220 can exchange data with remote user device 210. Although not pictured, it is understood that remote server 220 may further exchange data with any number of client devices over the network 250. The client devices can be any suitable type of computing device, such as a general-purpose computer, special purpose computer, laptop, desktop, integrated circuit, mobile device, smartphone, tablet, or other suitable computing device. In some embodiments, blockchain files such as discrete blocks, may be exchanged between multiple household appliances (e.g., exemplary appliances 100 in FIG. 1, 2, or 3).

Item management system 200 is described herein according to an exemplary embodiment of the present subject matter. However, it should be appreciated that the exemplary functions and configurations of item-management system 200 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter. It should be understood that inclusion of appliance 100 is illustrated by way of example only, in at least some embodiments, more than one appliance (e.g., two appliances, three appliances, or more) may be used within the system 200 at the same time.

Controller 170 of appliance 100 or controller 270 of remote user device 210 generally has access to an item list of one or more stored items. The item list generally indexes or records household items (e.g., items in a household that a user inputs into the item list). Along with a record (i.e., listing) of one or more stored items, the item list may include an appliance-suitability status for such items. In some embodiments, each item includes multiple appliance-suitability statutes that each correspond to separate appliances within the system. For instance, a first appliance suitability status of a stored item may correspond to a first appliance while a second appliance suitability status of the stored item may correspond to a second appliance. Such appliance suitability statuses may indicate that a particular stored item is appropriate for certain appliances (e.g., appliance types) while being inappropriate for other appliances (e.g., appliance types). For example, a bowl may be appropriate for a dishwasher appliance and a refrigerator appliance, but not appropriate for a cooktop appliance or the freezer chamber (e.g., freezer chamber 124) of the refrigerator appliance. Optionally, the item list may include an appliance-suitability status of a stored item for each appliance within the system.

In some embodiments, an image for the item list may be captured by second camera assembly 272 on remote user device 210. In some embodiments, an image for the item list may be captured by camera assembly 180 on appliance 100. In some embodiments, an image for the item list may be sourced from a remote server (may be server 220 or a separate remote server accessible by network 250), such as a stock image or an image of the item from a website. A user may upload the image of the item into the item list. The item list generally includes at least one pre-captured image of each stored item in the item list.

Further, the item list may include a type of responsive action for each appliance in the system that an item is inappropriate for. Such responsive actions may include, for instance, a visual or audio alert message, or a restricted-functionality operation (e.g., wherein certain features or functionalities of the appliance are disabled or otherwise prevented). As an example, if an inappropriate item is identified in a freezer, an alert may be sent to the refrigerator appliance display (such as controls 160 in FIG. 1), or to a remote user device (e.g., remote user device 210). As an additional or alternative example, if inappropriate item is identified on a cooktop, the cooktop may turn off or refuse to turn on burner assembly 102. As another additional or alternative example, a washing machine may be limited to only a cold-water wash or a gentle cycle.

In some embodiments, the item list may include an appliance-suitability status of one or more items for a plurality of appliance models. The plurality of appliance models may include household appliance 100. For example, the item list may include the suitability status for a refrigerator appliance model of the system, a dishwasher appliance model of the system or a cooktop appliance model of the system. In some embodiments, the appliance-suitability status may be set for each appliance or appliance model in the system by the user.

In additional or alternative embodiments, the item list states the type of alert to perform with each appliance in the item list. An alert may be a message displayed on a display (e.g., a display connected to controls 160 or 260), which may include visible text, images, icons, etc. to be read or observed by a user. A type of alert may include an unsuitable message. An unsuitable message may include an indication that an article is present on or in an appliance that it is designated as unsuitable for in the item list. The alert displayed may be a message stating the item detected and the appliance it was detected on. In some embodiments, the alert displayed may include an image received from a camera assembly (e.g., camera assembly 280 or camera assembly 272).

In some embodiments, the alert may generally state or indicate that a responsive action is being directed (e.g., performed or initiated) at an appliance in response to determining an item with an identified unsuitable status. In particular, the identified unsuitable status may correspond to the appliance at which the responsive action is being directed. As an example, the alert may display a message indicating burner assembly 102 is turned off in response to an identified item with unsuitable status being identified on cooktop appliance 100. As an additional or alternative example, the alert may display a message indicating a washing machine on select cycles only (e.g., cold water wash or gentle cycles) in response to an identified item with unsuitable status being identified in the washing machine appliance.

Another type of alert may include a confirmation message (e.g., including visible text, images, icons, etc. to be read or observed by a user). In some embodiments, confirmation message may include a confirmation request to confirm a condition wherein an identified item on a household appliance is correct (e.g., appropriate for a corresponding appliance). The confirmation request may include displaying a request for user input to confirm identification of the identified item. For example, an alert may include a message displayed with a user confirmation request, the request allowing the user to indicate whether an identified item in an image from a camera assembly is correctly identified. The message may include the image of the item, the item's identity and a message asking if the identity is correct. An answer from the user as to the correctness of the identity of the item may be received following the message, as described in more detail herein.

The item list may include historical data for one or more of the stored items, such as a record of where each item was purchased, the purchase date, the purchase price, etc. In some embodiments, historical data may include a purchase-history record for one or more of the stored items in the item list. Additionally or alternatively, historical data may include whether the item was a gift, who the item is owned by, the preferred cleaning method of the item, the heat limit of the item, or etc., may also be included within the item list. Other records of the item, including a miscellaneous user statement about the item may be included with some or each item in the item list. Other information about the item may also be included, as would be understood. Advantageously, adding more than appliance-suitability status for each item may serve as a record to aid a user in replacing items that are broken or provide important information about items in the item list. Thus, users of the item may be able to use the item list to find care or use instructions for the item based on the information in the item list for each included item, as well as using the item list with appliances in the household to preserve the safety of items or appliances within the household.

In some embodiments, the item list may be stored on remote server 220. Controller 170 or controller 270 may access the item list via network 250 and may also adjust the item list (e.g., in response to directed user input). For instance, in adjusting the item list, controller 170 or controller 270 may add data to the item list, alter previously recorded data, or delete data from the item list. In some embodiments, each user may generate an item list specific to his/her needs. Thus, multiple discrete item lists that correspond to discrete individual users may be provided. In alternative embodiments, a single item list may be provided per household, and multiple users within that household may access the item list for that household.

In some embodiments, system 200 may include an item management software. The item list may be accessed or managed by the item management software. Item management software may be located on remote server 220 (e.g., in memory 224) and may be executed by processor 222. Additionally or alternatively, item management software may be accessed by remote user device 210 (e.g., via controller 270). In some embodiments, appliance 100 can access item management software, for example, by controller 170 and processor 132. The item list may include a user-defined table of images linked to item descriptions and the appliance-suitability status for each item defined in the table. In some embodiments, a user may add an item to the item list by using camera assembly 180 or camera assembly 272 to capture at least one image of the item to be added to the item list. The user may then upload the at least one image of the item to the item list and add in details about the appliance-suitability status of the item to the list by using the remote user device 210 or by using the controls of the household appliance 100. Other information may also be added to the item list by the user as described herein (e.g., purchase information, cleaning information).

Item management software may be included with or otherwise accessed by a controller, the controller configured to identify an item from the item list in an image from a camera assembly (e.g., camera assembly 180, external camera assembly directed at cabinet 120 of appliance 100). For example, image management software may include image recognition software with artificial intelligence software, allowing the controller to compare pixels in an image received by a camera assembly to known combinations of pixels from the item management software to identify items in the item list from an image provided by the camera assembly, or as discussed in more detail herein. In some embodiments, item management software may further be able to receive corrective input from a user if an identification of an item in the item list was a correct identification or not and use the user corrective input to improve identification techniques, as will be described in more detail herein. In some embodiments, item management software is housed on remote server 220 and accessed by either remote user device 210 or household appliance 100.

Figure 5:
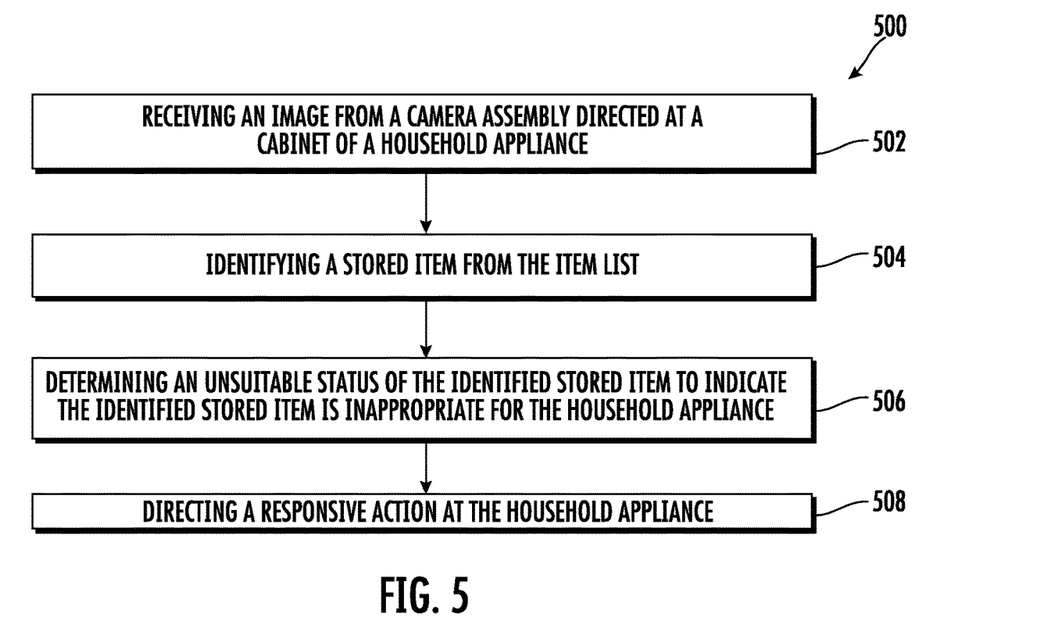
FIG. 5 provides a flow chart illustrating a method of item management for connected appliances according to exemplary embodiments of the present disclosure.
Figure 6:
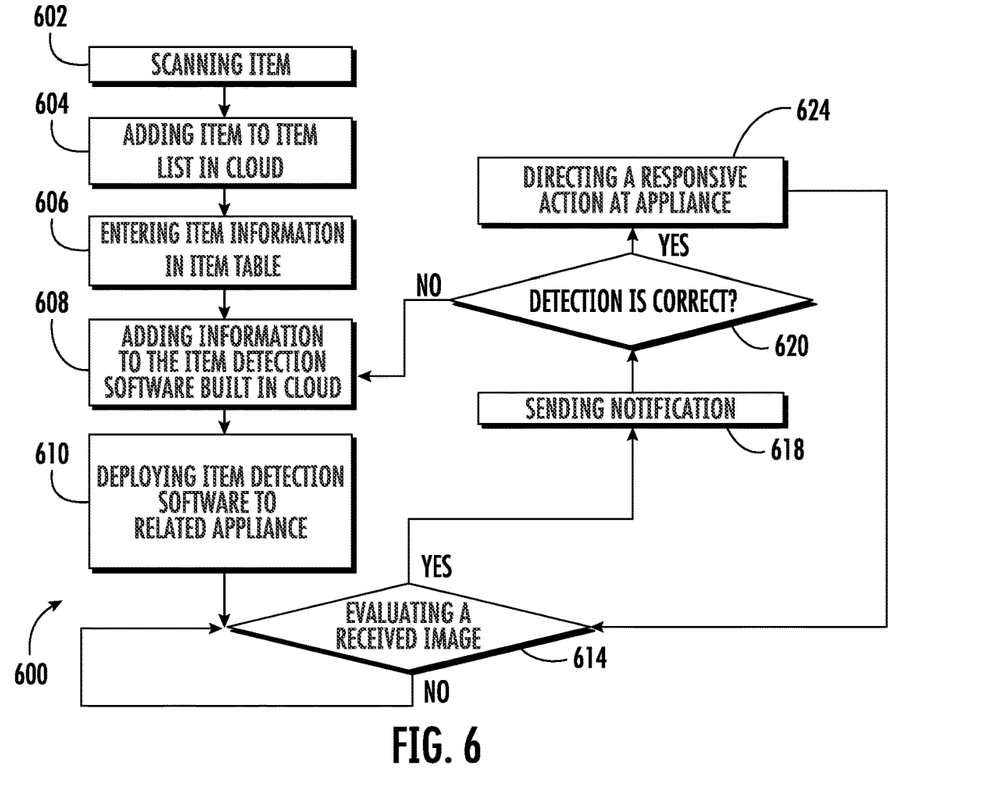
FIG. 6 provides a flow chart illustrating a method of item management for connected appliances according to exemplary embodiments of the present disclosure.

Referring now to FIGS. 5 and 6, various methods (e.g., method 500 or method 600) may be provided for use with system 200 in accordance with the present disclosure. In some embodiments, all, or some of the various steps of the method(s) may be performed by a suitable controller (e.g., controller 170 or 270). Thus, controller 170 or 270 may be configured to direct such a method (e.g., as or as part of an item-management operation). During such methods, controller 170 or 270 may receive inputs and transmit outputs from various other portions of the system 200. For example, the controller 170 or 270 may send signals to and receive signals from another controller, camera assembly 180, second camera assembly 272, or a free camera assembly directed at cabinet 120 of appliance 100. The present methods may advantageously prevent misuse of one or more items with one or more appliances. For instance, the disclosed methods may advantageously address or alert a user to a condition wherein an article being placed on or in a household appliance and the article is improper for use with that household appliance.

FIGS. 5 and 6 depicts steps performed in a particular order for purpose of illustration and discussion. Those of ordinary skill in the art, using the disclosures provided herein, will understand that (except as otherwise indicated) the steps of any of the methods disclosed herein can be modified, adapted, rearranged, omitted, or expanded in various ways without deviating from the scope of the present disclosure.

Turning especially to FIG. 5, at 502, the method 500 includes receiving an image from a camera assembly (e.g., camera assembly 180 or a camera assembly external to appliance 100—FIGS. 1 through 3) directed at a cabinet of a household appliance. In some embodiments, step 502 includes receiving a pre-captured image of an item from the camera assembly prior to receiving the image from the camera assembly. The pre-captured image of the item may be placed in the item list prior receiving the image from the camera assembly. In certain embodiments, step 502 may include directing the camera to obtain an image of the appliance or the cabinet of the appliance. Although the term "image" is used herein, it should be appreciated that according to exemplary embodiments, the camera assembly may take any suitable number or sequence of two-dimensional images, videos or other visual representations of the household appliance, the cabinet, or an item positioned therein or thereon. For example, one or more images may include a video feed or series of sequential static images obtained by the camera assembly that may be transmitted to the controller (e.g., controller 170 or 270) for analysis or other manipulation. The image may be transmitted, for example, as a data signal. These obtained images may vary in number, frequency, angle, field-of-view, resolution, detail, etc.

At step 504, method 500 includes identifying a stored item from the item list. The item list may be as described herein. The stored item may be identified in the image received from the camera assembly directed at the cabinet of the household appliance Step 504 may be performed automatically based on the received image in step 502. In some embodiments, step 504 further includes identifying a specific household appliance in the image from the item list.

In some embodiments, step 504 may include analyzing the image to identify an item from the item list is in the image. According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor the cabinet or items placed therein or thereon. It should be appreciated that this image analysis or processing may be performed locally (e.g., by controller 170 or 270) or remotely (e.g., by offloading image data to a remote server or network).

Specifically, the analysis of the one or more images may include implementation an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on image differentiation, e.g., such as a pixel-by-pixel comparison of two sequential images. This comparison may help identify substantial differences between the sequentially obtained images, e.g., to identify movement, the presence of a particular object, the existence of a certain condition, etc. For example, one or more reference images may be obtained when a particular condition exists, and these references images may be stored for future comparison with images obtained during appliance operation. Similarities and/or differences between the reference image and the obtained image may be used to extract useful information for improving appliance performance.

According to exemplary embodiments, image processing may include blur detection algorithms that are generally intended to compute, measure, or otherwise determine the amount of blur in an image. For example, these blur detection algorithms may rely on focus measure operators, the Fast Fourier Transform along with examination of the frequency distributions, determining the variance of a Laplacian operator, or any other methods of blur detection known by those having ordinary skill in the art. In addition, or alternatively, the image processing algorithms may use other suitable techniques for recognizing or identifying items or objects, such as edge matching or detection, divide-and-conquer searching, greyscale matching, histograms of receptive field responses, or another suitable routine (e.g., executed at the controller 170 or 270 based on one or more captured images from one or more cameras). Other image processing techniques are possible and within the scope of the present subject matter. The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image.

In addition to the image processing techniques described above, the image analysis may include utilizing artificial intelligence ("AI"), such as a machine learning image recognition process, a neural network classification module, any other suitable artificial intelligence (AI) technique, and/or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking, R-CNN may include taking an input image and extracting region proposals that include a potential object or region of an image. In this regard, a "region proposal" may be one or more regions in an image that could belong to a particular object or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the covn5 property map instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models. According to exemplary embodiments, it should be appreciated that the machine learning models may include supervised and/or unsupervised models and methods. In this regard, for example, supervised machine learning methods (e.g., such as targeted machine learning) may help identify problems, anomalies, or other occurrences which have been identified and trained into the model. By contrast, unsupervised machine learning methods may be used to detect clusters of potential failures, similarities among data, event patterns, abnormal concentrations of a phenomenon, etc.

It should be appreciated that image processing and machine learning image recognition processes may be used together to facilitate improved image analysis, object detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

Step 504 may include additionally identifying a cabinet of the appliance in the image received. For example, an image may identify as a refrigerator chamber. In some embodiments, the camera assembly the image is received from may aid in identifying the appliance the image is depicting. In some embodiments, step 504 includes correlating the cabinet of the appliance identified with the included appliances in item list. Thus, in certain embodiments, the item in the image may be correlated with being in the freezer chamber or with being in the refrigerator chamber based on which camera assembly the image was received from. For instance, referring to the above example in which the image was identified as an image of a cabinet of a dishwasher, the image may be correlated to the dishwasher appliance in the item list.

Each portion of the appliance 100 that may be separately identified may be given separate instructions of suitable status or unsuitable status for each item included in the item list. For example, a bowl may have suitable status for refrigerator chamber 122, and unsuitable status for freezer chamber 124.

Method 500 includes at step 506, determining an unsuitable status of the identified stored item to indicate the identified stored item is inappropriate for the household appliance. Step 506 may be performed based on identifying the stored item. For example, identified item in image may be identified, and cabinet 120 may be associated with a specific appliance 100. The item and appliance 100 may be correlated with item list to determine if the item is suitable or unsuitable for the identified appliance. The status of the item may then be determined as suitable or unsuitable status for the appliance upon which the item is shown to be on or in in the image received. Additionally or alternatively, step 506 may include referencing an appliance-suitability status of the identified stored item for the household appliance. In some embodiments, step 506 includes referencing the appliance-suitability status of the identified stored item corresponding to the household appliance.

Method 500 includes at step 508 directing a responsive action at the household appliance (e.g., based on 506). In some embodiments, the responsive action takes on one or more forms.

As an example, the responsive action may include halting activation of the household appliance. For instance, if the item is identified as being a bowl on cooktop 100 of FIG. 2, the responsive action may include halting activation of a burner assembly 102, and thereby preventing heat generation of the same. In another example, if the item is identified as a handwash only pot in dishwasher 100 of FIG. 3, the responsive action may include halting activation of dishwasher cycles, and thereby preventing washing by the same. In yet another example, if the item is identified as a hang-to-dry clothing article in a dryer appliance, the responsive action may include halting activation of dry cycles of the dryer appliance, preventing improper handling of the hang-to-dry clothing article. Advantageously, halting activation may prevent items or appliances from being damaged by inappropriate use.

As an additional or alternative example, the responsive action may include limiting operation of the household appliance to one or more predefined functions. Optionally, the item list may specify which functions are allowable and which should be limited when an item is identified as unsuitable for that appliance. For instance, a dish may be oven safe, but only under a set temperature, so, if the dish is identified as in the oven, the oven may be limited to a limited predefined function having an operating temperature below the set temperature for the dish. The item list may specify the predetermined function for each appliance and each item. The predetermined functions for each appliance and each item may be user defined. In another instance, an article of clothing may be identified in a washing machine and may further be identified as unsuitable unless the washing machine washes on cold or gentle cycles. Thus, if the article of clothing is identified in the washing machine by the image received from the camera assembly, the washing machine may be limited to only cold wash functions or only gentle cycle functions. Advantageously, this course of responsive action may allow appliance use to continue, but in a way that is appropriate for the item and the appliance and may result in no damage to either.

In some embodiments, the responsive action comprises a projection of an alert message a display of the system. For example, a display that an item is placed inside a freezer and is inappropriate for the freezer may be displayed on controls (e.g., controls 160 in FIG. 1) of the refrigerator. In an additional or alternative example, a display that an item is placed in or on an inappropriate appliance may be displayed on a display of the remote user device of the system. For example, an alert on a smartphone connected to the system may be displayed when an item is identified as an unsuitable status for the appliance it is identified with in the image. Such may be performed as detailed by the method 500 herein. Advantageously, displaying an alert may allow an appliance to continue to perform appropriate functions, while alerting the potential for a damaged item to aid in avoiding said damage. For example, turning off or limiting functions of a freezer because a cup unsuitable for a freezer was identified as being in the freezer would run the risk of spoiling the other items in the freezer. Additionally or alternatively, the alert may serve to alert a user of the system that an item is being placed in or on an unsuitable appliance, allowing the user to be notified without being in the same area as the item or the unsuitable appliance.

In some embodiments, the responsive action may be selectable by the user. For example, the user may pre-select the responsive action for each item or for each appliance or for each combination of appliance and item when inputting items into the item list. In some embodiments, directing a responsive action at step 508 may include displaying a list of responsive actions on a user display (e.g., a display or controls 260 on remote user device 210) and requesting a user select the responsive action. Step 508 may include receiving a user selection of a responsive action or performing the user selected responsive action. Performing the user selected responsive action may be done in response to receiving the user selection of the responsive action.

In additional or alternative environments, method 500 may include, prior to direction the responsive action of step 508, receiving a user confirmation signal affirming identification of the stored item following identifying the stored item. In some embodiments, an affirmation identification may be sent to the user (e.g., by way of a display on the remote user device or the household appliance). In some embodiments, receipt of a user confirmation signal may include receiving a signal (e.g., transmitted in response to a user pressing a button or control 160 or 260). The confirmation request may be sent as a part of the method 500, to verify proper identification of the item. Such request may be performed in all instances, sometimes, or by user request. If the user confirmation signal affirms identification of the stored item, the method 500 may continue to step 508.

In some embodiments, step 508 may include verifying detection of an item. Verifying detection of the item may include displaying a verification questionnaire for the image and item identified. In some embodiments, verifying detection of the item may include receiving a user verification that the correct item was identified. Additionally or alternatively, verifying detection of the item may include receiving a user verification that the item was incorrectly identified. The step 508 may also include, in response to receiving the user verification, updating the item list in response to the user verification. If the item is identified correctly, the item list may be updated, for example, with the image having the item corresponding to the item identified being added to the item list. If the item is identified incorrectly, the software may update to include that the image is not correlated with the item it was misidentified as.

Turning especially to FIG. 6, at step 602, the method 600 includes scanning an item. For example, scanning the item may include capturing an image of the item using a camera assembly in the system (e.g., camera assembly 180 or camera assembly 272). In some embodiments, scanning the item may include directing a camera assembly of the system to capture an image containing a depiction of the item. In some embodiments, the method 600 may include receiving the image of the scanned item from the camera assembly.

At step 604, the method 600 includes adding the item of 602 (e.g., a recorded entry thereof) to an item list onto a remote server (e.g., via network 250 or onto remote server 220 of FIG. 4). For example, a text record of the item may be added to an item list. In some embodiments, the image containing a depiction of the item received from the camera assembly may be added to the remote server.

At step 606, the method 600 includes entering item information about the item added to the item list in step 604 into the item list (e.g., by way of controls 260 of remote user device 210 or by way of controls 160). For example, entering item information to the item list may include entering which appliances in the system the item is unsuitable for. Additionally or alternatively, entering item information may include entering purchase history information or care information (such as washing instructions, maximum heat limits, etc.) for the item into the item list. In addition or alternative embodiments, information entered to the item list may be associated with the item added in step 602 in the item list.

At step 608, the method 600 includes adding information to an item detection software, as described above, and as may be generally understood. The added information may include or otherwise indicate the item and related item information in the item list to the analysis aspects of the item detection software. For example, adding an item or item information from the item list to the item detection software may allow the item to be detected in images using the item detection software, as described herein (e.g., method 500).

At step 610, the method 600 includes deploying the item detection software to related appliances in the system. For example, remote user device 210 or appliance 100 may be able to access item detection software housed in remote server 220. In additional or alternative embodiments, item detection software may be downloaded or saved on remote user device 210 or appliance 100. For example, item detection software may be stored on memory 214 or memory 134. Item detection software may be accessed or used by processor 212 or 132 of controller 270 or 170.

At step 614, the method 600 includes evaluating a received image. In particular, the image may be received from a camera assembly, (e.g., as in step 502 of method 500). In certain embodiments, step 614 may include directing the camera to obtain an image of the appliance or the cabinet of the appliance. Although the term "image" is used herein, it should be appreciated that according to exemplary embodiments, the camera assembly may take any suitable number or sequence of two-dimensional images, videos or other visual representations of the household appliance, the cabinet, or an item positioned therein or thereon. For example, one or more images may include a video feed or series of sequential static images obtained by the camera assembly that may be transmitted to the controller (e.g., controller 170 or 270) for analysis or other manipulation. The image may be transmitted, for example, as a data signal. These obtained images may vary in number, frequency, angle, field-of-view, resolution, detail, etc.

Once received, the image may be analyzed in an attempt to detect an item therein. Analysis of the image may be done in as described in step 504, including any suitable image processing technique, image recognition process, or as described herein. If an item is detected, the method 600 proceeds to step 618. By contrast, if an item is not detected, the step may be is repeated.

At step 618, a notification is sent to the user. In some examples, the notification is a message sent to a remote user device and displayed to the user that an item detected as inappropriate for the appliance it was detected in step 614. In some embodiments, the notification may be sent directly to the appliance, such as a display on an appliance.

At step 620, a request may be sent to the user to determine if the notification was correct. For example, the notification message of step 618 may include, or be followed by a prompt displayed on a display of the system to request a user input. The prompt may request whether the notification and detection of the item was correct. The method at step 620 further includes receiving the user determination if the item detection was correct or incorrect. If the detection is incorrect, the method includes adding the incorrect information to the item detection software. In some embodiments, the item detection software may use the incorrect determination to analyze future images brought to the software. Thus, the item detection software may be an artificial intelligence learning type software, or a software that improves over iterative processes, as would be understood in light of the present disclosure. If the detection is correct, the method includes directing the appliance to perform a responsive action at the household appliance at step 624.

In additional or alternative embodiments, the responsive action of step 620 may be overridden by a user request. For example, the user may override the responsive action on remote user device. In some examples, the user may override the responsive action using controls of the household appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An item-management system, the system comprising:
    a household appliance comprising a cabinet;
    a camera assembly directed at the cabinet to capture an image of the cabinet; and
    a controller in operative communication with the camera assembly, the controller having access to an item list of one or more stored items, the controller being configured to direct an item-management operation, the item-management operation comprising:
        receiving the image from the camera assembly,
        identifying, automatically based on the received image, a stored item from the item list,
        determining, based on identifying the stored item, an unsuitable status of the identified stored item to indicate the identified stored item is inappropriate for the household appliance, and
        directing, based on determining the unsuitable status, a responsive action at the household appliance.

2. The system of claim 1, wherein the item list comprises an appliance-suitability status of the one or more items for a plurality of household appliances, the plurality of household appliances comprising the household appliance, and
    wherein determining the unsuitable status comprises referencing the appliance-suitability status of the identified stored item for the household appliance.

3. The system of claim 1, wherein the item list comprises a pre-captured image of each stored item of the one or more stored items.

4. The system of claim 3, wherein the pre-captured image is received from the camera assembly prior to receiving the image from the camera assembly.

5. The system of claim 3, wherein the pre-captured image is received from a secondary camera assembly of a remote user device.

6. The system of claim 1, wherein the controller accesses the item list from a remote network.

7. The system of claim 1, wherein the system comprises a remote user device, the remote user device comprising the controller, the controller in operative communication with the household appliance and with the camera assembly.

8. The system of claim 7, wherein the item-management operation further comprises directing an adjustment of items within the item list prior to receiving the image from the camera assembly.

9. The system of claim 1, wherein the item list comprises a purchase-history record of each stored item of the one or more stored items.

10. The system of claim 1, wherein the responsive action comprises halting activation of the household appliance.

11. The system of claim 1, wherein the responsive action comprises limiting operation of the household appliance to one or more predefined functions.

12. The system of claim 1, wherein the household appliance comprises a display attached to the cabinet, and wherein the responsive action comprises projection of an alert message at the display of the household appliance.

13. The system of claim 1, further comprising a remote user device, the remote user device comprising a remote user display,
    wherein the responsive action comprises projection of an alert message at the remote user display.

14. The system of claim 1, wherein the item-management operation further comprises receiving, prior to directing the responsive action, a user confirmation signal affirming identification of the stored item following identifying the stored item.

15. A method of directing an item-management operation, the method comprising the steps of:
    receiving an image from a camera assembly directed at a cabinet of a household appliance;
    identifying, automatically based on the received image, a stored item from an item list of one or more stored items;
    determining, based on identifying the stored item, an unsuitable status of the identified stored item to indicate the identified stored item is inappropriate for the household appliance; and
    directing, based on determining the unsuitable status, a responsive action at the household appliance, wherein the camera assembly is directed at the cabinet to capture the image of the cabinet, and wherein a controller in operative communication with the camera assembly and having access to the item list is configured to direct the item-management operation.

16. The method of claim 15, wherein the household appliance comprises the camera assembly.

17. The method of claim 15, wherein the item list comprises an appliance-suitability status of the one or more items for a plurality of household appliances, and wherein determining the unsuitable status comprises referencing the appliance-suitability status of the identified stored item corresponding to the household appliance.

18. The method of claim 15, wherein the responsive action comprises limiting operation of the household appliance to one or more predefined functions or halting activation of the household appliance.

\* \* \* \* \*